United States Patent
Allen

(10) Patent No.: US 6,231,796 B1
(45) Date of Patent: May 15, 2001

(54) PULSED METHOD FOR CREATING COMPOSITE STRUCTURES

(76) Inventor: Edward H. Allen, 1533 Sumac Dr., Logan, UT (US) 84321

( * ) Notice: Subject to any disclaimer, the term of this patent is extended or adjusted under 35 U.S.C. 154(b) by 0 days.

(21) Appl. No.: 08/846,030

(22) Filed: Apr. 25, 1997

Related U.S. Application Data

(60) Provisional application No. 60/017,346, filed on Apr. 26, 1996.

(51) Int. Cl.⁷ .............................. B29C 73/12; B29C 43/14
(52) U.S. Cl. ................. 264/72; 264/70; 264/314
(58) Field of Search ................. 264/70, 71, 72, 264/266, 255, 314

(56) References Cited

U.S. PATENT DOCUMENTS

| | | | |
|---|---|---|---|
| 3,024,150 | * | 3/1962 | Urbannetti ............................. 264/70 |
| 3,508,301 | * | 4/1970 | Brown ................................... 264/70 |
| 3,876,744 | * | 4/1975 | Onder ................................... 264/105 |
| 4,312,822 | * | 1/1982 | Bonnet ................................... 264/70 |
| 4,526,733 | * | 7/1985 | Lau ....................................... 264/12 |
| 5,306,129 | * | 4/1994 | Ibar ....................................... 264/70 |

* cited by examiner

Primary Examiner—Angela Ortiz
(74) Attorney, Agent, or Firm—Thompson E. Fehr

(57) ABSTRACT

A pulsed method for creating composite structures employs a pulsed application of compaction force to composite material. During the application of the compaction force, curing energy is intermittently or continually supplied to the composite material. One type of machine employing this process may create a single batch; another such machine incrementally advances the raw or partially cured composite material to create a continuous cured and compacted length of composite material. Preferably, for the single batch machine, the pulsed compaction energy diminishes in amplitude or ceases upon the gelation of the composite material; and, for the continuous manufacturing machine, each increment of composite material is moved, prior to or at gelation of the increment of composite material, into an area of the machine where pressures are continuous.

3 Claims, 6 Drawing Sheets

PULSED METHOD FOR CREATING COMPOSITE STRUCTURES

CROSS-REFERENCE TO RELATED APPLICATION

This is a continuation of U.S. provisional application Serial No. 60/017,346, filed on Apr. 26, 1996, now abandoned.

BACKGROUND OF THE INVENTION

1. Field of the Invention

This invention relates to a method of manufacture for structural sandwich panels, laminates, and profile shapes from polymer matrix composite material, such as fiberglass, graphite epoxy, or other matrix and reinforcement materials, especially when a resultant composite material is intended to have a very high structural performance (such as a high strength-to-weight ratio or high interlaminar shear strength). This invention further relates to such fabrication methods which are suitable for adaptation to mechanization and automation, such as pultrusion, continuous resin transfer molding, heated belt continuous laminating presses, and like means of art. (As used herein with respect to the present invention, matrix composite material refers to the adherent material which bonds reinforcement particles together; composite material used without the word "matrix" preceding "composite material" denotes the combined matrix and reinforcement.)

2. Description of the Related Art

Previously, parts comprised of reinforcement and matrix molecularly bonded to a core (including plate, sandwich panel, and profile shapes) have utilized a constant pressure compaction process.

The typical constant pressure process entails laying reinforcement and core material (either by hand or through the use of a tape-laying machine, a filament winding machine, or other machine) onto a mold or mandrel and, if the reinforcement is not pre-impregnated with matrix precursor, wetting it with such precursor (either manually or under pressure in a resin transfer process), and applying pressure and heat or other curing energy (such as electron beams, microwave radiation, ultraviolet radiation, or infrared radiation).

The pressure is often provided by a press, a vacuum bag (sometimes augmented with elevated air pressure in an autoclave), or other mechanical means. Other means, however, do exist to apply a clamping pressure. (See, e.g., U.S. Pat. No. 4,560,603 of Jeffrey A. Giacomel, which is entitled "Composite Matrix with Oriented Whiskers" and which discloses the use of electromagnetic fields for this purpose and U.S. Pat. No. 4,021,288 of Donald F. Hannon, which is entitled "Attachment for Converting a Sheet Laminating Machine" and which discloses the utilization of mechanical rollers to provide the requisite pressure.) And electrostatic force as well as centrifugal force is known in the prior art to be useful for creating the desired pressure.

The function of pressure during the curing process is to provide compaction of the reinforcement. Compaction is desired in order to squeeze excess matrix from the product so that the highest possible ratio of the volume occupied by reinforcement (a strong material) to the sum of the volumes occupied by matrix (a weak material) and void is achieved. (Such ratio is termed the "packing ratio.") This, of course, produces the strongest resultant material as a product.

Considerable effort is expended by manufacturers of the highest quality composite parts to assure that high compaction levels are achieved. In may cases, for example, a vacuum bag is fitted to the part being manufactured and pumped down after each few layers of reinforcement are laid down. This process of incremental compaction while the part is being manufactured is called "debulking." Only when all the layers are in place is the final vacuum bag fitted, the part moved to the autoclave, and high pressure applied together with heat in order to cure the product or part.

Pulsed pressure has been utilized in the process of U.S. Pat. No. 5,268,055; but that pressure is employed only during the preparatory debulking stage, not during the stage which produces a cured product. There is no recognition in U.S. Pat. No. 5,268,055 that pulsed pressure can be utilized at much lower forces than constant pressure during the stage which produces a cured product.

The compaction processes used to date, moreover, require that the resins serve as a lubricant so that, as clamping pressure is applied, the fibers (of the reinforcement) may slide past one another and seek the tightest packing. Generally, tight packing ratios can not be achieved without very great clamping pressures as well as heat (to reduce viscosity) since the fibers (of the reinforcement) tend to hold their positions because of surface friction. Very high pressures, while effective in achieving high packing ratios, however, attain such high packing ratios by cross-sectional deformation of and, often, damage to the fibers (of the reinforcement) and to any inclusions. (Inclusions are materials other than the composite material which are either on one side of the composite material or between successive layers of composite material and which may also extend into the composite material. Examples of inclusions are core material and fittings.) Such damage necessarily reduces the strength and integrity of the product. Moreover, it is difficult and expensive to achieve high clamping pressures; expensive autoclaves often develop a pressure of more than 500 psi.

When the principles discussed above for the prior art have been applied to the design of a machine for the continuous manufacture of laminated material, two types of machines have emerged.

The first such type are designated as Goldsworthy-type machines, in recognition of the patents issued to William B. Goldsworthy, e.g, U.S. Pat Nos. 4,498,941; 4,402,778; 4,420,359; and 4,495,021. In U.S. Pat. No. 4,498,941 Goldsworthy teaches "[a] method for high speed continuous production of reinforced plastic sheets and reinforced plastic sheet laminate structures. . . . One or more layers of resin-impregnated, fiber-containing, reinforced plastic composite material is brought into contact with surfaces of one or more endwise abutted relatively flat panels. The panel or panels are then passed between a pair of continuously rotating belts. A pressurized air body . . . forces the belts into intimate contact with the layers forming the reinforced plastic laminate structure. . . . The belts may be heated so as to facilitate the curing. . . ." This manufacturing machine, thus, employs continuous pressure and heat.

The second type of machine for the continuous manufacture of laminated material is pultrusion process machines in which dry material is pulled through a bath of resin and then through a die that performs the compaction by means of constant pressure.

SUMMARY OF THE INVENTION

The present invention has several objectives and advantages:

(1) To have a process which works satisfactorily even when the resultant product contains inclusions, such as core material or fittings.

(2) To achieve in a composite material, high packing ratios without utilizing high clamping pressures.

(3) To attain such high packing ratios without deformation of, or damage to, the reinforcement or any inclusions.

(4) To provide for the convenient embodiment of the method in a continuous manufacturing machine that is not required to resist extreme pressures.

Still further objectives and advantages will become apparent from a consideration of the ensuing disclosure and drawings.

The primary technique through which these objectives and advantages is attained is the utilization of pulsed pressure during the curing process.

The use of pulsed pressure, as opposed to continuous pressure, for the compaction of reinforcement materials and inclusions in a composite material during cure permits, as discussed below, attaining the optimum reinforcement-to-matrix ratio, i.e., packing ratio, with minimum compaction pressure. Minimum compaction pressure is desired in order to reduce manufacturing costs and to avoid damage to reinforcement materials and inclusions during compaction. As distinguished from extrusion, pultrusion, and Goldsworthy-type machines, the present process can produce sandwich structures and other laminated products with embedded inclusions that are too fragile to survive the heavy continuous pressures required in the prior art.

The process of the present invention is, furthermore, useful for both discrete molding and continuous manufacture of products.

DESCRIPTION OF THE PREFERRED EMBODIMENT

The present invention achieves the greatest compaction of reinforcement without damaging or deforming such reinforcement. This is accomplished by repetitive, differential movement of the reinforcement until a very tight packing is achieved.

This process is applicable to the manufacture of composite materials that, when finished, are comprised of reinforcement fibers, needles, microspheres, grains, or other shapes of structural material (reinforcement) bound together by adherent matrix materials such as, but not limited to, organic polymers, carbon, metal alloys, and ceramics.

The tightness of the packing is often expressed as the Groemer packing ratio, i.e., the ratio of the sum of the volumes of each element of reinforcement to the volume occupied by the total resultant compacted composite material. (It will be apparent that the Groemer packing ratio measures the degree of compaction just as does the packing ratio defined earlier but that these ratios differ numerically from one another.)

For equal-sized circular cross-section fibers of reinforcement, the (theoretical) maximum, the so-called "Groemer Packing" (named after Helmut Groemer, a mathematician who specialized in studying the problem of compaction), corresponds to slightly over 90 percent fiber with less than 10 percent of the total volume occupied by matrix material and void. If it is permissible to deform the fibers from a circular cross section, of course, a higher Groemer packing ratio may be attained.

For equal-sized spherical particles, the Groemer Packing corresponds to approximately 80 percent particles with 20 percent of the total volume occupied by matrix material and void. Again, deformation will lead to a higher ratio.

For other cross-sectional shapes, of equal or of unequal size, the theoretical maximum may be different.

In practice, because of packing defects (such as with diagenic sedimentation, where the formation of voidless sedimentary rock by natural compaction requires substantial deformation, breakage, and pressure solution of grains during compaction), the Groemer Packing is never achieved. Thus, the tightest practical packing in which the reinforcements are not deformed is termed the "maximal" packing.

Actual testing of the present invention has so far demonstrated that packing ratios can be improved by at least 25 percent with pulsed pressure as compared to constant pressure of the same magnitude as the peak of the pulse. This greater compaction improves the physical properties of the resultant compacted composite material substantially. For example, in tests at the Inventor's laboratory, most samples show a 10 percent improvement in interlaminar shear as well as a similar improvement in flexural modulus and other properties when compacted using pulsed pressure rather than continuous pressure of the same magnitude.

Figure 5:
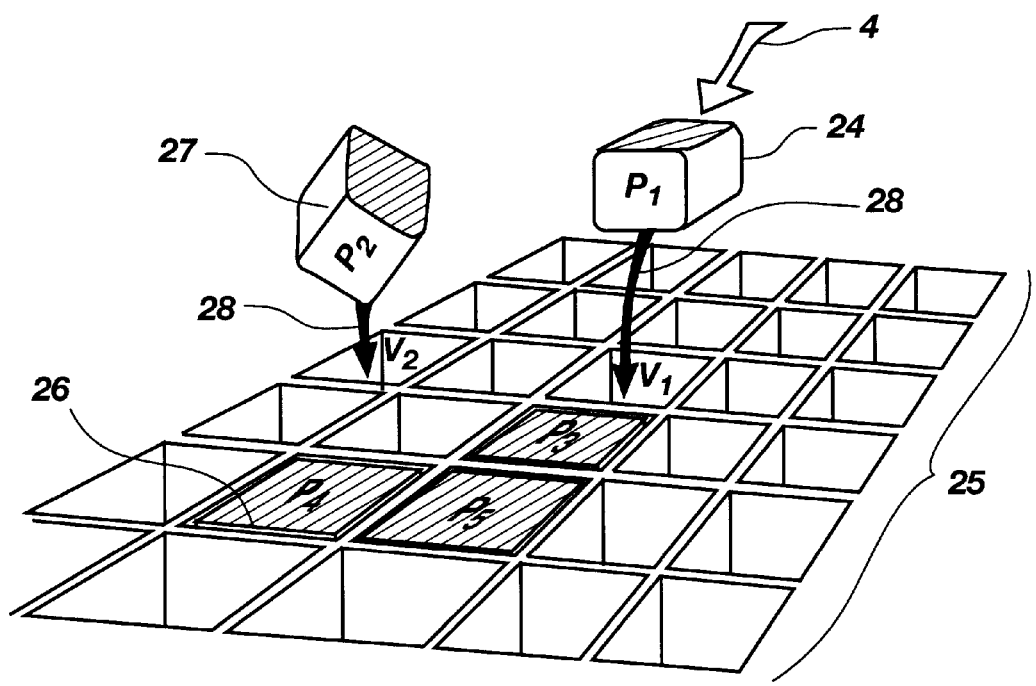
FIG. 5 is a conceptual diagram of the pulsed process for achieving a Groemer packing.

FIG. 5 is a schematic of the compaction process that is at the heart of the present invention. In the compaction process, a reinforcement particle 24 is moved into position by a compaction force 4. The array of optimal packing positions 25 for all reinforcement particles (as defined by Groemer's work) is schematized as a matrix of cubical holes some of which are already filled with ideally placed particles 26 while others are empty. (As used in the preceding sentence, matrix refers to a geometric or mathematical array rather than denoting the adherent material which binds the reinforcement; but this illustrates a likely source of the name for the name of the adherent matrix material.) Further elements of FIG. 5 are discussed below and include unfavorably positioned particles 27 as well as the displacement of particles 28 as a result of the application of a compaction force 4.

Repetitive pressure or compaction force pulsation as a strategy for achieving maximal packing relies on stochastic principles. Referring to FIG. 5, assume that a reinforcement particle 24 of a certain shape must occupy any one of the "proper" volumes in an array of (conceptual) holes 25 if maximal packing is to be built. In an experiment, a compaction force 4 is applied or pulsed so as to result in displacement 28 of the reinforcement particle 24 toward one of the proper positions in the array. There is a non-zero probability that the trajectory and orientation of the reinforcement particle 24 will be close enough to that required so that it will slip into the proper position, i.e., the position of an ideally placed particle 26 when subjected to the pulsed compaction force 4. Obviously, the particle does not need to be perfectly aligned with the target position to slip into that position; there is some out-of-tolerance allowance permitted that depends on a number of the detailed features of, and the dynamics of, the experiment. For example, if the reinforcement particle 24 were a round fiber and were submerged in lubricating fluid matrix, the probability of acceptable alignment might be substantially greater than that of perfect alignment. Other particles may, however, not be so fortuitously positioned and, thus, not fall into the proper position when subjected to the pulsed compaction force 4 but remain as unfavorably positioned particles 27.

If reinforcement particles 24 are randomly redistributed prior to each pulse, the probability of a successful result rises as the number of pulses increases provided that well-placed reinforcement particles 26 stay where they have be put and poorly placed reinforcement particles 27 do not. That is, for each pulse of compaction force 4, the probability of success is p(x) where x is the event of acceptable alignment; conversely, the probability of failure is 1−p(x). The probability of repeated failure over n successive applications of pulsed compaction force 4 is of the form of a product of many probabilities, i.e., $[1-p(x)]^n$ for a simple case. In the limit, as the number of pulses goes to infinity, $[1-p(x)]^n$ becomes a vanishingly small number (since p(x) must necessarily be a positive number less than 1); and the probability of the optimal placement of a single reinforcement particle 24 approaches certainty.

The presence of surface forces in the curing matrix during pulsed compaction tends, however, to order the random placement process and to cause it to converge to a tight packing. Such surface forces also greatly reduce the expected number of repetitions required to achieve maximal packing. Because of such surface forces, those reinforcement particles 26 that lie in maximal packing positions tend to stay there, while those reinforcement particles 27 that are misplaced tend to move about when a pulse is relaxed. This selective effect drives the pulsed compaction process to a maximal packing cumulatively and, thus, quickly.

The explanation for this selective effect is simple: when a reinforcement particle 26 is in its optimal position, it has the maximum contact area with its neighbors. This is, in fact, part of the definition for maximal packing, viz., minimal matrix and void volume implies maximum contact surface between the reinforcement particles 24. Consequently, the total strength (strength per unit area times total area in contact) of the structural bond holding reinforcement particle 24 to reinforcement particle 24 is greater for maximally packed reinforcement particles 26 than for loosely packed reinforcement particles 27. Moreover, of course, the curing process is one in which such structural bonds intensify and multiply.

By contrast, a reinforcement particle 27 that is not in an optimal position is marked by a reduced surface contact area and, thus, diminished adhesion (until the matrix material gels). This is illustrated in FIG. 5 by the presence of the conceptual walls of the matrix 33: when a reinforcement particle 26 is in its proper position, it has at least five walls bonded by the matrix 33 to other ideally placed reinforcement particles 26; when a reinforcement particle 27 is not in an optimal position, it has only a few points of contact with other reinforcement particles 24 (because when the compaction force 4 is applied to an unfavorably positioned particle 27, such unfavorably positioned particle 27 will not seat completely in the matrix).

As a result, at each successive pulse of the compaction force 4, the maximally packed reinforcement particles 26 tend to stay put and thereby withdraw from the play of succeeding pulses of compaction force 4. Therefore, fewer and fewer reinforcement particles 24 participate as the repetitions proceed; and, in much the same way as a crystal grows, a maximal packing is built stochastically but cumulatively.

In many real composite manufacturing processes, this selective bonding is manifest by the cross linking that is the basis for polymer matrix curing. When a pressure cycle forces a reinforcement particle 26 into a proper position, such ideally placed reinforcement particle 26 tends to adhere; and when a reinforcement particle 27 lands improperly, any cross links have less to which to adhere.

Obviously, pulsed compaction is not so attractive for composites where no bond selection takes place, as where curing proceeds suddenly or where no curing, in the sense of an increase in bond strength, takes place (as with debulking).

Figure 4:
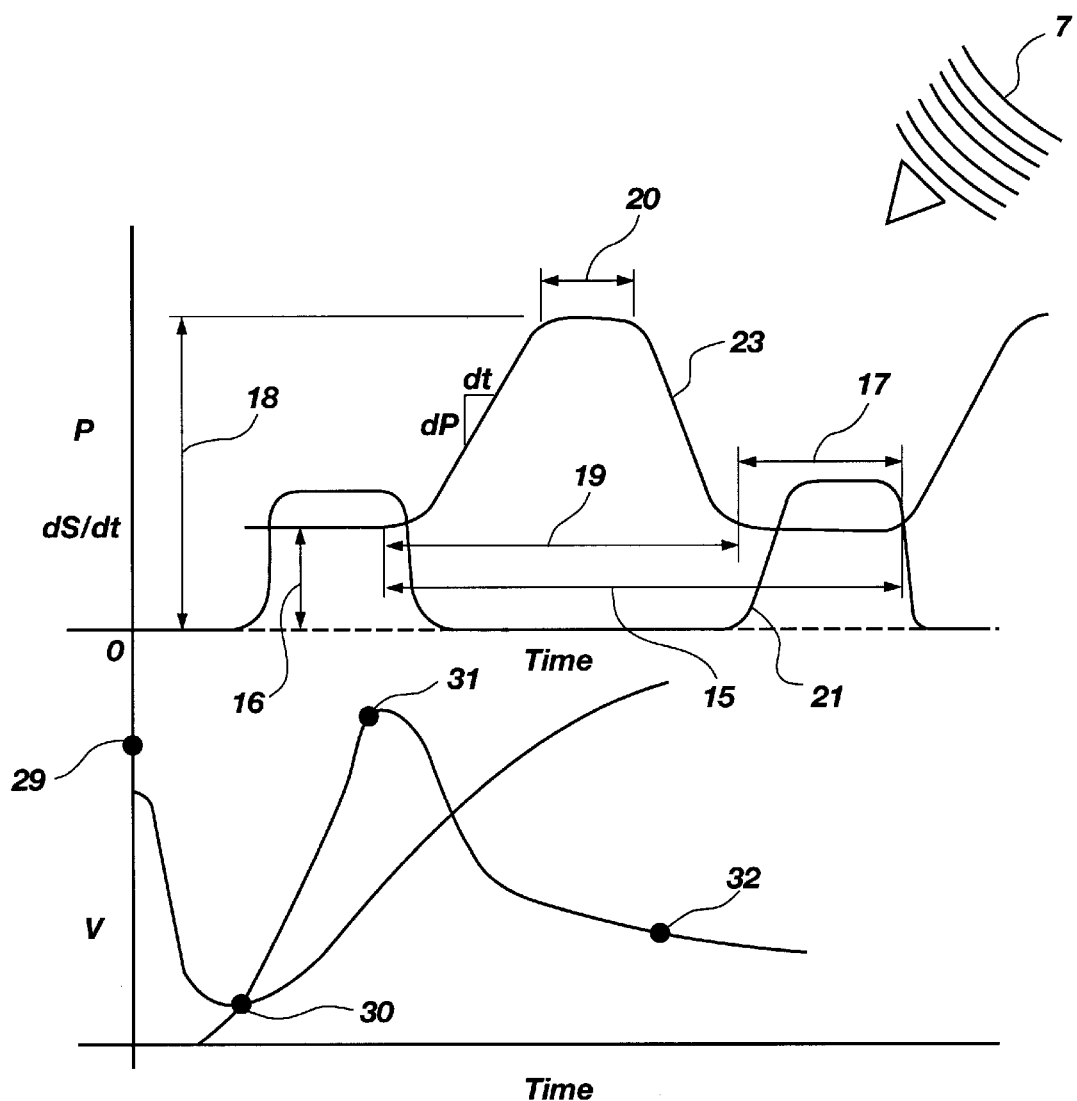
FIG. 4 is a diagram of the pulsed pressure wave and the basic cure cycle for thermoset resin.

FIG. 4a illustrates a typical event of the application of the pulsed compaction force. In the graph, the time history of the compaction force 23 is shown in the upper trace, while the time history of position 21, in response to the compaction force, for the composite material being processed within a continuous manufacturing machine is shown in the lower trace. During application of the pulsed compaction force, curing energy is also applied (either continuously or intermittently) to the composite material being processed.

Referring now to the time history of the compaction force 23 in FIG. 4a, the compaction force applied rises at a certain rate, dP/dt. This rate must be selected to minimize the establishment of inappropriate crosslinks; thus, the rate must be quick but not so quick that reinforcement particles 24 are damaged or crosslinks, once established, are broken. With respect to the time history of the compaction force 23, the significant features are pulse frequency 15, pulse width 19, trough length 17, peak force 18, minimum or floor force 16, and duration of peak force 20.

The lower graph in FIG. 4a, which—as stated above—is a time history of position 21 for the composite material being processed within a continuous manufacturing machine shows that during periods of peak pressure in the continuous manufacturing machine, the composite material is not moved through the machine (dS/dt is zero) but that during periods of minimum pressure, the composite material is advanced through the machine (dS/dt is positively non-zero).

It should be observed that the entire pressure wave (time history of compaction force 23) is elevated above ambient; that is, the minimum pressure 16 is never permitted to drop to zero. This establishment of a minimum pressure 16 is required in order to minimize movement within the composite material as the pressure is cycled. Movement within the composite material can lead to severed crosslinks and related problems.

In FIG. 4b is shown a typical curing cycle for a thermoset resin. Initially, the resin is quite viscous; as curing energy is applied (typically, though not necessarily, heat), the viscosity falls past the initial point of workability referred to as the flow point 29 and continues to fall until it reaches the minimum viscosity point 30. The crosslinking process then causes the viscosity to rise at an increasing rate; the rate reaches a maximum at the gelation point 31, where crosslinking reaches it maximum rate. After this point, pulsed compaction pressure does little good and, in fact, can cause damage to the composite material if movement is allowed to occur within the composite material to the extent that the crosslinks can be broker.

Therefore, from the gelation point 31 to the completed cure point 32, care must be taken if pulsed pressure is to be used. Generally speaking, one should preferably taper the amplitudes of the pulsed pressure wave such that the risk of damage to the composite material is minimized after gelation. In the continuous manufacturing machine this is accomplished by moving each increment of composite material, prior to or at gelation of the increment of composite material, into an area of the machine where pressures are continuous. In open molds and similar applications, this is done by scheduling the pulsations to diminish in amplitude or cease at gelation.

The flow point 29 and the completed cure point 32 are typically defined by the operator of the machine employing the process of the present invention. The minimum viscosity point 30 and the gelation point 31 are defined by natural rheological forces.

The preferred physical embodiment for employing the process of the present invention is the continuous manufacturing machine. In the continuous manufacturing machine, raw composite material (for example, prepreg fiber composite material), i.e., composite material that has either not been cured or that has only been partially cured, is subject to pulses of either vibrating or steady compaction force, which may, for example, be a mechanical force or electrostatic or magnetic forces. During application of the pulsed compaction force, curing energy is also applied (either continuously or intermittently) to the raw composite material. Such curing energy may, for example, be heat, infrared radiation, ultraviolet radiation, microwave radiation, or electron particle beams.

As discussed above, during that portion of each pulse when the greatest compacting force is applied, the composite material is stationary with respect to the machine. During the remainder of each pulse, the compacting force is relaxed, though not so much as to permit the composite material to delaminate or to "bulk up" again; and the composite material is advanced incrementally through the machine by pulling or pushing devices that are well known in the art. Afterwards the cycle is repeated.

During each cycle, curing energy is applied by devices that are well known in the art, for example, generators of heat, infrared radiation, ultraviolet radiation, microwave radiation, or electron particle beams.

Repeated cycles result in fully cured and compacted composite material of indefinite length.

The continuous manufacturing machine produces continuous lengths of composite material of open cross sections (such as plates, sandwich panels, channel beams, I-beams, etc.) as well as closed cross sections (such as tubes, airfoils, box beams, etc.).

The process of the present invention is most competitive when producing structural composites of high performance, such as high strength-to-weight ratio composite material, high interlaminar shear composite material, or the like; but lower performance composite material and non-structural composite material can also be made using the same process.

Figure 3:
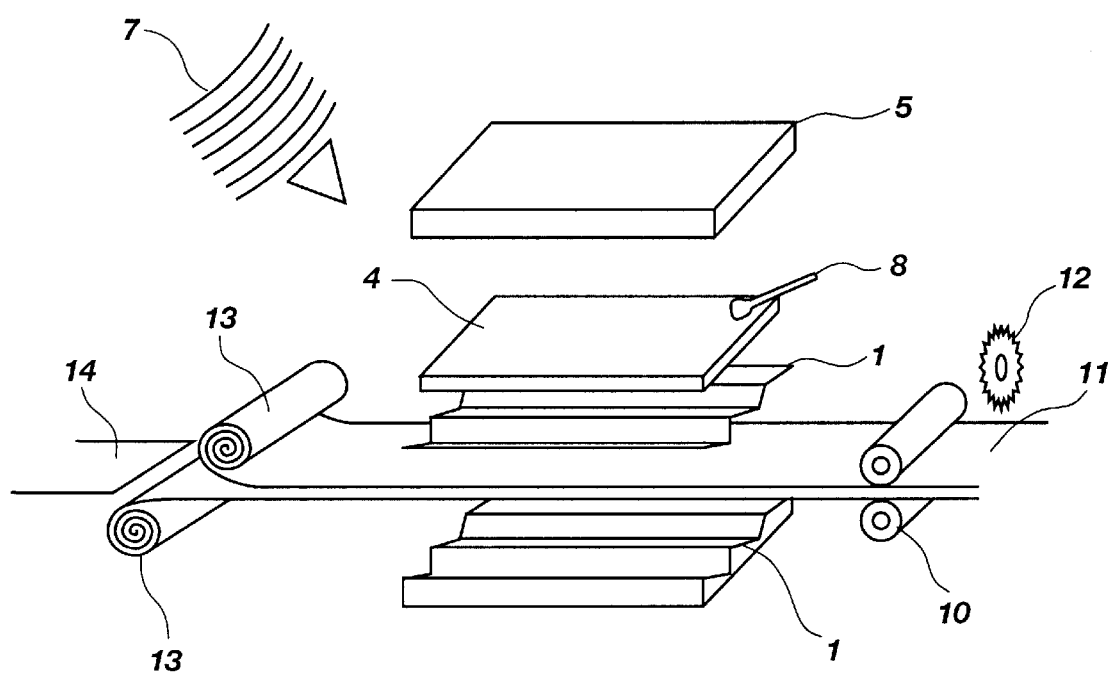
FIG. 3 illustrates the preferred embodiment of the invention, i.e., a continuous composite plate, sandwich panel, or profile shape manufacturing machine.

FIG. 3 illustrates the continuous manufacturing machine, which may—for clarity—be termed a "pulsed-pressure continuous manufacturing machine." As discussed above, such a machine is capable of manufacturing continuous sheet material or profile shapes.

Rolls of raw material 13, with or without core materials or other inclusions 14 interleaved, enter the pulsed-pressure continuous manufacturing machine where they are formed between platens 1 of the desired profile shape. Curing energy 7 is supplied by a generator of curing energy 7 which is well known in the art. A generator of compaction force 8 which is well known in the art supplies the compaction force but does so in pulses, rather than continuously. The curing energy 7 and the compaction force are applied between the elements of a suitable frame or containment means 5 (only partially illustrated in FIG. 3). Between pulses of pressure a transport (pulling or pushing) device 10 that is well known in the art advance the material incrementally through the machine. At the end of the cycles, the finished composite material 11 is cut into a desire length using a cutting means 12 such as a saw.

As discussed above, during the low-pressure portion of the pressure pulsation cycle, the reinforcement may tend to disaggregate slightly even though residual pressure or other containment forces prevent the composite material from bulking up again. Selective forces exist that tend to maintain the compaction of that portion of the composite material which is optimally compacted yet permit the disaggregation of the rest. Such forces are the "surface forces" acting to attract the reinforcement particles 24 one to another; and there are several such forces in a gelling matrix—including the adhesive character of the matrix, surface tension, crosslinking, and other rheological effects.

Figure 1:
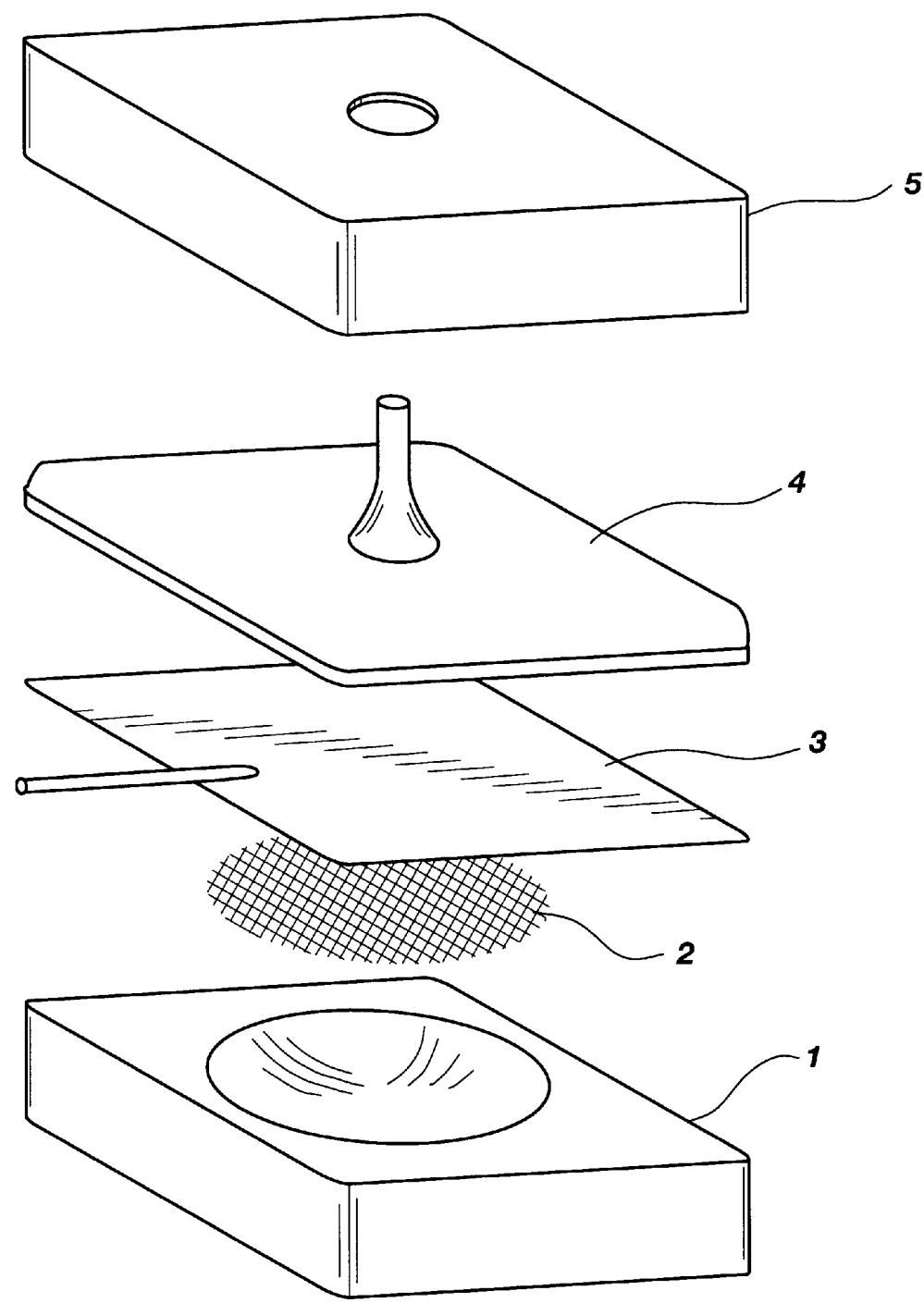
FIG. 1 is an exploded view of the invention in one of its simplest embodiments, i.e., a mold or platen filled with uncured composite material and fitted with a vacuum bag, a pressure bladder, and a containment frame.

FIG. 1 shows an exploded view for one of the simplest embodiments for employing the process of the present invention. The compacting means therein is mechanical pressure developed between a mold, pattern, or platen 1 and a pressure bladder 4 (a form of force-generating means) that is appropriately contained by a container 5. In accordance with established art, the raw composite material 2 is inserted between the platen 1 and the pressure bladder 4 (a form of compaction force-generating means), together with an optional vacuum bag 3 that, among other functions, provides a minimum force floor and facilitates the expression of unwanted gases, vapors, and overfill (excess matrix 9).

Figure 2:
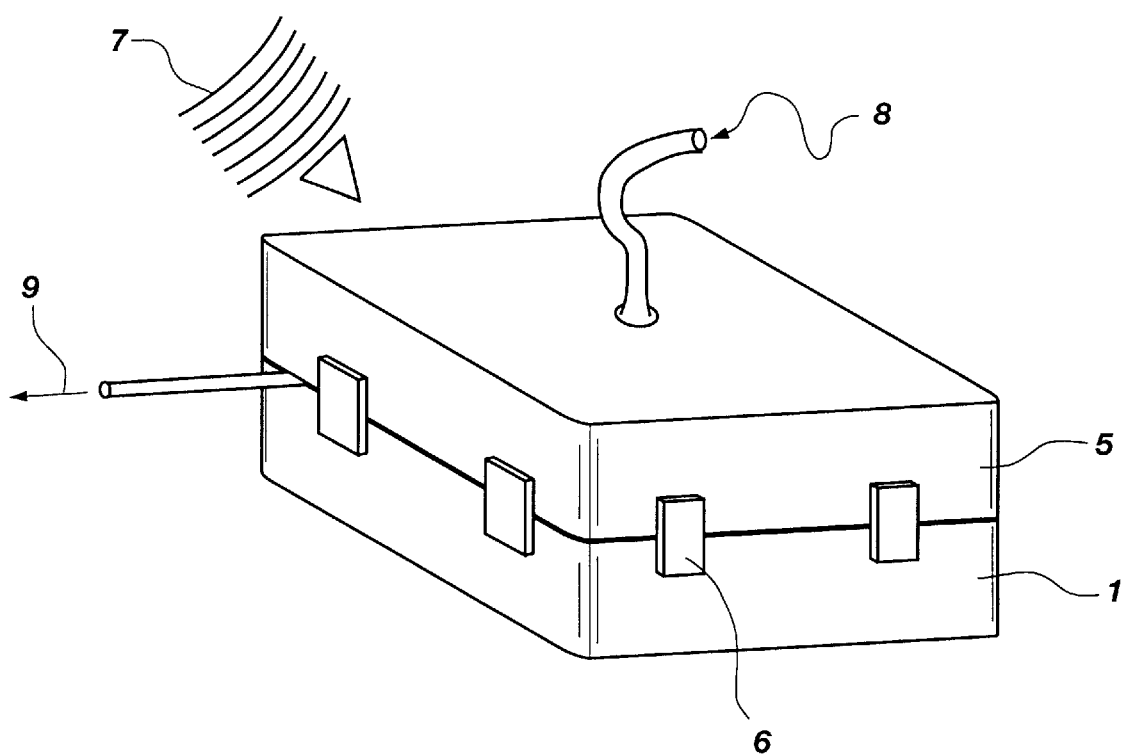
FIG. 2 depicts the embodiment of FIG. 1 when such embodiment has been closed and is ready for processing.

FIG. 2 demonstrates the embodiment of FIG. 1 after such embodiment has had its container 5 closed so that the embodiment is ready to process the raw composite material 2. The container 5 is maintained closed by a latch 6 or other binding means. Processing consists of the application of pulsed forces by a generator of compaction force 8 which is well known in the art and the intermittent or continuous application of curing energy 7 during application of the pulsed compaction force as well as the withdrawal of vapor, gas, and excess matrix 9, if needed.

Again, the curing energy may, for example, be heat, infrared radiation, ultraviolet radiation, microwave radiation, or electron particle beams.

While pulses of air or fluid pressure developed by suitable pumps or other devices and transmitted to the pressure bladder 4 are used to move the reinforcement particles 24 into the final, compacted position in this simple embodiment, as described above, useful embodiments of the present invention include many other approaches to moving the reinforcement particles 24 into place, including, but not limited to, many other types of force, pressure, or clamping that, depending on the part being made and other factors, may be more convenient that a fluid-filled bladder and platen. For example, the composite material may be compacted in a press-type structure between two rigid surfaces; the composite material may, itself, incorporate one or both pressure surfaces as an integral element, thus requiring only or, perhaps, no force/pressure surface tool or platen (as, for example, when bonding or co-curing parts); or pressure may be supplied hydraulically from the resin of the matrix, itself (as in resin transfer molding). Moreover, if the reinforcement is reacted directly by inertial force (i.e., in a centrifuge), by electrostatic force, or by magnetic force, the same results are achieved provided the force can be pulsed in accordance with the concept of the invention.

Figure 6:
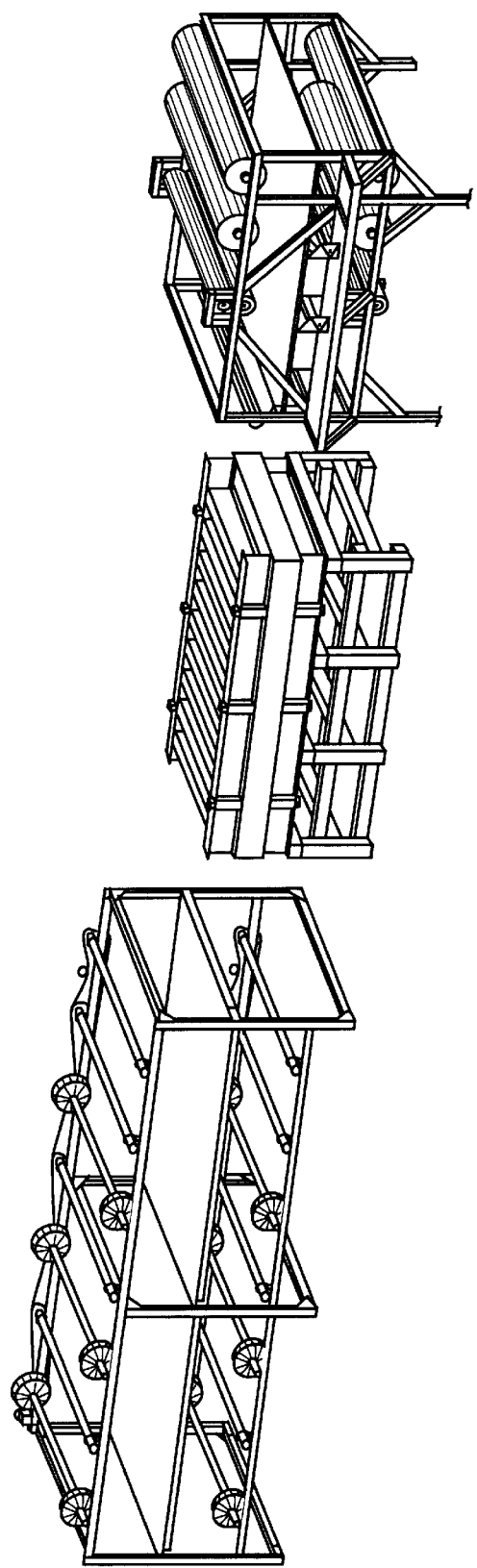
FIG. 6 portrays one embodiment of a machine for employing the process of the present invention.

Although the preceding disclosure contains many specifics, these should not be construed as limiting the scope of the invention, but as merely providing illustrations of some of the presently preferred embodiments of this invention. Various other embodiments and ramifications are possible within the scope of this invention. For example, while the continuous manufacturing machine shown in FIG. 6 is one embodiment for employing the process of the present invention, many variations on that machine can easily be imagined and should not be excluded from the scope of this invention.

Thus, the scope of the invention should be determined by the appended claims and their legal equivalents, rather than by the examples given.

I claim:

1. A pulsed method for creating composite structures, which comprises:
    providing a polymer matrix composite material comprising reinforcement materials bound together by adherent matrix materials,
    applying to the composite material repetitive pulsed compaction force,
    during the application of the pulsed compaction force, applying curing energy to the composite material,
    the amplitude of the pulsed pressure wave created by the compaction force is tapered after gelation such that the risk of damage to the composite material is minimized,
    wherein a very tight packing is achieved.

2. The pulsed method for creating composite structures as recited in claim 1, further comprising:
    during periods of minimum pressure, advancing the composite material incrementally through the area where the compaction force is applied.

3. A pulsed method for creating composite structures, which comprises:
    providing an uncured polymer matrix composite material comprising reinforcement materials bound together by adherent matrix materials;
    applying to said uncured polymer matrix composite material a repetitive, pulsed compaction force to achieve very tight packing, wherein the amplitude of the pulsed pressure wave created by the compaction force is not constant; and
    during the application of the repetitive, pulsed compaction force, applying curing energy to said uncured polymer matrix composite material.

* * * * *